United States Patent [19]

Yoneyama et al.

[11] Patent Number: 4,601,562

[45] Date of Patent: Jul. 22, 1986

[54] CAMERA

[75] Inventors: Saburo Yoneyama, Musashino; Masami Fujita, Machida; Shizuo Ishii, Tokyo; Mutsuhito Kichima, Asaka; Yoshiharu Takahashi; Yoshinobu Sameshima, both of Hachioji, all of Japan

[73] Assignee: Konishiroku Photo Industry Co., Ltd., Tokyo, Japan

[21] Appl. No.: 676,013

[22] Filed: Nov. 29, 1984

[30] Foreign Application Priority Data

Dec. 10, 1983 [JP] Japan ............................ 58-190672[U]
Dec. 10, 1983 [JP] Japan ............................ 58-190673[U]
Dec. 10, 1983 [JP] Japan ............................ 58-190674[U]

[51] Int. Cl.⁴ .......................... G03B 1/12; G03B 17/02
[52] U.S. Cl. ..................................... 354/170; 354/288
[58] Field of Search ...... 354/159, 202, 288, 170-173.1

[56] References Cited

U.S. PATENT DOCUMENTS 4,315,680 2/1982 Gunderson ..................... 354/288 X
4,493,542 1/1985 Ohmura et al. ................. 354/288 X Primary Examiner—Michael L. Gellner
Attorney, Agent, or Firm—Jordna B. Bierman

[57] ABSTRACT

A camera wherein a camera body is a rectangular shape and long sideways, a first camera parts accommodating chamber and a second camera parts accommodating chamber are disposed at the both sides of a film advancing unit including a film take-up chamber and a patrone chamber, respectively, and a rear cover is arranged such that its edge is positioned at the boundary between the film advancing unit and the second camera parts accommodating chamber.

16 Claims, 6 Drawing Figures

4,601,562

CAMERA

BACKGROUND OF THE INVENTION

1. Field of the Invention

The present invention relates to a camera, such as a 35 mm half-size camera using a roll film of 35 mm width.

2. Description of the Prior Art

In the case of a camera using the 35 mm film, generally speaking, there is used a system in which a patrone chamber and a film take-up chamber are arranged sideways of a taking lens, as viewed from the front, so that the film is advanced sideways. As a result, the camera under consideration is charged with the film, which is accommodated in a patrone standardized in conformity with JIS (i.e., Japanese Industrial Standards) K7528, ISO (i.e., International Organization for Standardization) 1007 and so on, so that, when it is used for photography in an ordinary state, a horizontally long frame can be obtained for a full-size camera having an exposure frame sized 24×36 mm but the frame is vertically elongated for a half-size camera having an exposure frame sized 24×18 mm.

Here, the number of photographing shots of the user far more for the horizontally long frame than for the vertically long frame (Specifically, the number of the shots of the horizontally long frame predominates 70% or more according to the totalization of the present Applicant). This is because it is natural and excites a stable feeling to catch an object in the horizontally long frame. This tendency applies to the half-size camera which is turned by 90 degrees from an ordinary position to shoot the object.

Thus, the present Applicant has proposed a camera, such as a 35 mm half-size camera (which is disclosed in Japanese Utility Model Application No. 57-143658), in which a film take-up chamber and a patrone chamber are arranged one above the other around a taking lens so that the film can be advanced in a vertical direction. According to the camera thus disclosed, a photographic frame having a horizontally long shape can be obtained by shooting an object with the camera being held as it is in the ordinary position.

SUMMARY OF THE INVENTION

An object of the present invention is to improve the above-specified camera of the pending application so that it may be used more easily.

This object can be achieved by providing a camera comprising: an exposure frame having a rectangular shape; a film advancing unit including a film take-up chamber and a patrone chamber juxtaposed to each other adjacent to the respective longer sides of said exposure frame; and a taking lens disposed in front of said exposure frame, wherein the improvement resides in that, as viewed from the back of a camera body which is placed such that said exposure frame is long sideways:

(a) said camera has a nearly rectangular and long sideways shape of body;

(b) a first camera parts accommodating chamber is disposed at the righthand side of said film advancing unit whereas a second camera parts accommodating chamber is disposed at the lefthand side of the same; and (c) a rear cover is arranged such that its lefthand edge is positioned at the boundary between said film advancing unit and said second camera parts accommodating chamber.

Another object of the present invention is to provide a camera which contemplates to reduce the size of and make efficient the power transmission of a gear train unit, which connects a drive motor, a film takeup portion, a counter and so on, and to improve holdability of the camera.

This object can be achieved by a camera of the type, in which the exposure frame is arranged below the film take-up chamber whereas the patrone chamber is arranged below said exposure frame so that the film may be advanced in the vertical direction, wherein there are arranged at one side of a winding shaft, which is disposed in said film take-up chamber, the drive motor for driving said shaft and a power supply which is located below said drive motor, and wherein a frame number counter is arranged at the other side of said winding shaft.

Still another object of the present invention is to provide a camera which can partly smooth and ensure the film rewinding operation after completion of photograph-taking actions and partly to simplify the rewinding mechanism.

This object can be achieved by a camera of the type, in which the film take-up chamber, the exposure frame and the patrone chamber are arranged upright so that the film may be advanced in the vertical direction, wherein a patrone engaging shaft disposed in said patrone chamber is moved in the horizontal direction by the action of a rewind change-over member.

A further object of the present invention is to provide a camera which can facilitate the film exchanging operation even under the sun or the like which is so small in size and weight that it is shaped to grow accustomed to the hand of the taker for photography, and a camera which permits a quick film loading operation.

This object can be achieved by a camera of the type, in which the film take-up chamber, the exposure frame and the patrone chamber are arranged upright so that the film is advanced in the vertical direction, wherein a rear cover for covering said film take-up chamber, said exposure frame and said patrone chamber is hinged to an upper portion of the camera so that it can be opened in a direction to shield the solar beam when the film is exchanged.

Other objects and features of the present invention will be made apparent from the following description taken with reference to the accompanying drawings.

BRIEF DESCRIPTION OF THE DRAWINGS

In the accompanying drawings showing one embodiment of the present invention.

DESCRIPTION OF THE PREFERRED EMBODIMENT

Figure 1:
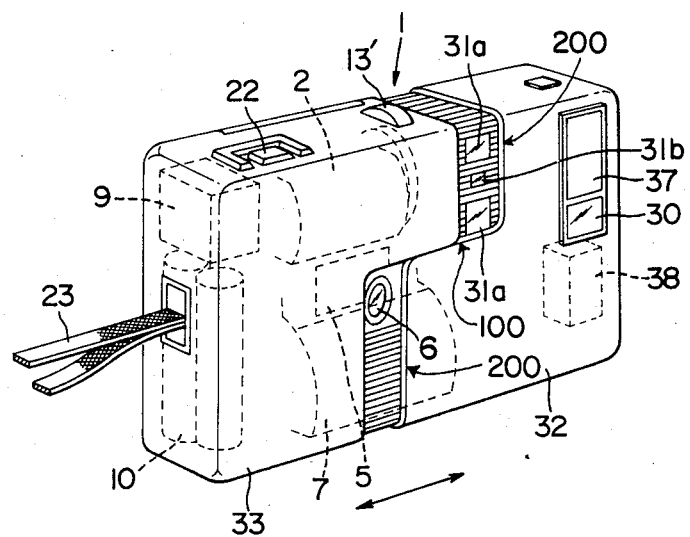
FIG. 1 is a perspective front view showing the state in which a slide cover is opened.
Figure 2:
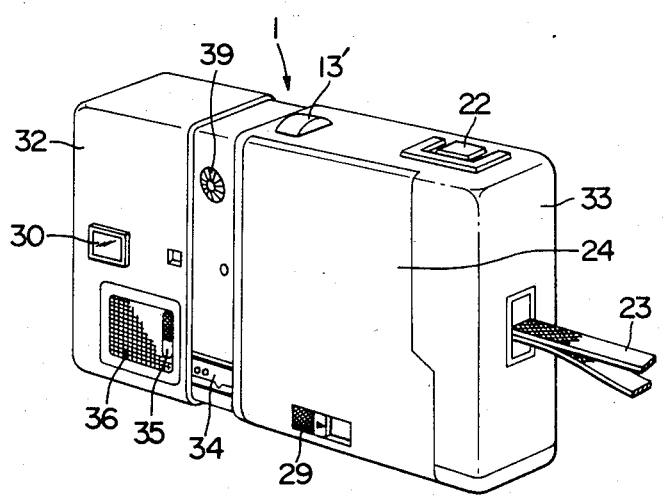
FIG. 2 is a perspective rear view in the same state.
Figure 3:
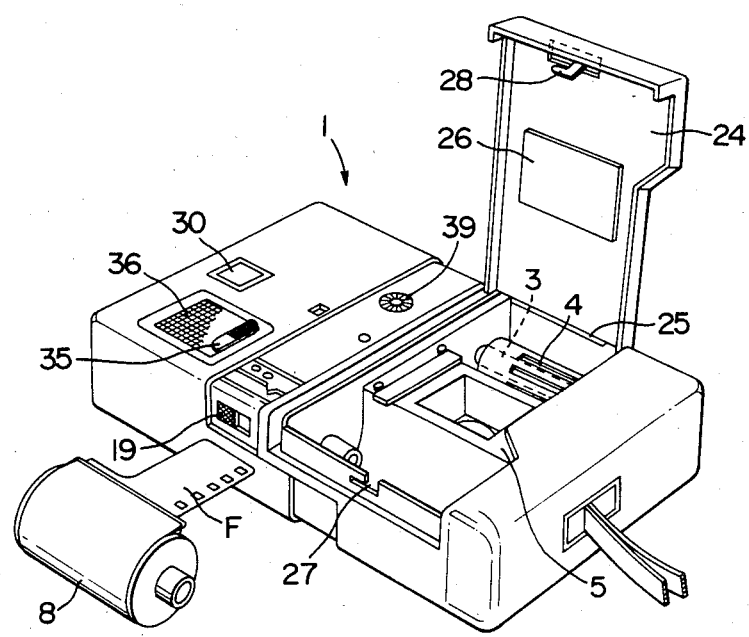
FIG. 3 is a perspective view showing the state in which a rear cover is opened.
Figure 4:
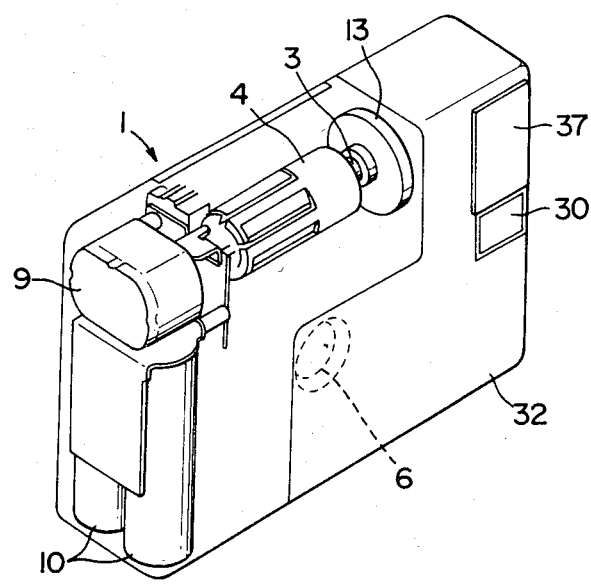
FIG. 4 is a perspective view showing the internal structure.

The present invention will be described in the following with reference to the accompanying drawings.

Reference numeral 1 generally indicates a camera body. Indicated at numeral 2 is a film take-up chamber which is formed in an upper portion of the camera body 1 for taking up or winding a film F. A take-up spool 4 is fixed on a winding shaft 3 which extends through the side wall of said film take-up chamber 2. Indicated at numeral 5 is an exposure frame which is disposed below said film take-up chamber 2. Said exposure frame 5 is disposed at the back of a taking lens 6 mounted in the front face of the camera body 1 and has a horizontally elongated shape (of 24×18 mm).

Indicated at numeral 7 is a patrone chamber which is formed below the aforementioned exposure frame 5. The film F, which is let off from a patrone 8 loaded in said patrone chamber 7, is advanced vertically along the back of the exposure frame 5 until it is taken up on the spool 4 which is mounted in the film take-up chamber 2 arranged above the exposure frame 5.

Figure 5:
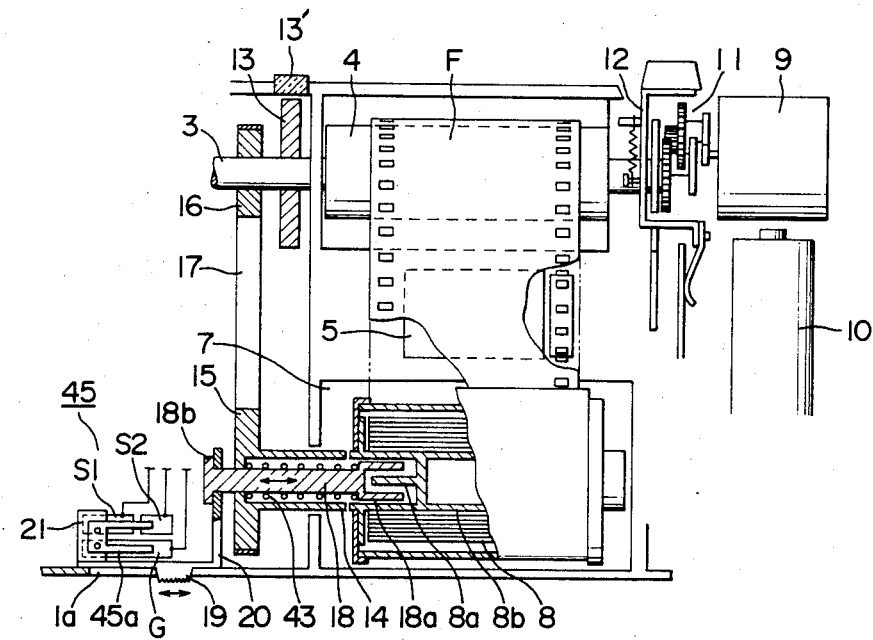
FIG. 5 is a sectional view showing a rewinding mechanism.
Figure 6:
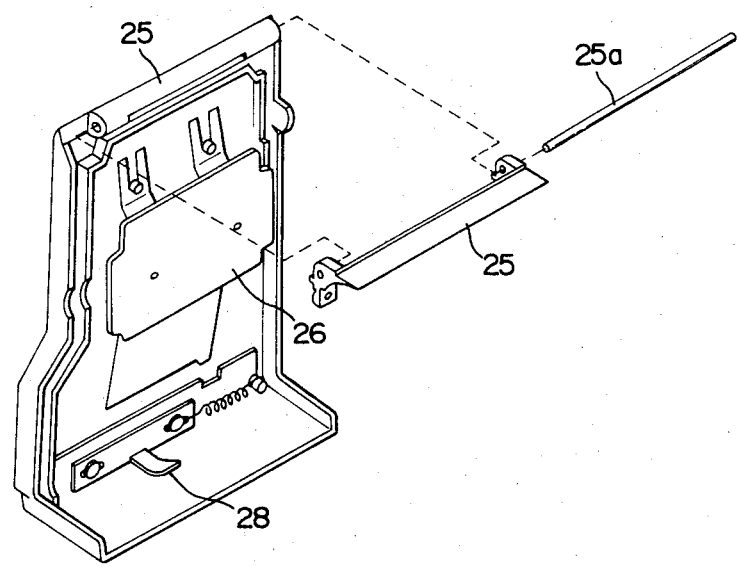
FIG. 6 is a perspective view showing the rear cover.

Indicated at numeral 9 is a drive motor which is arranged sideways (i.e., at a lefthand upper portion, as viewed from the front) of the winding shaft 3 in the film take-up chamber 2 for advancing and charging the film. Below said drive motor 9, there is arranged a power supply 10 which is exemplified by a dry cell of UM3. In a space defined by said drive motor 9, the film take-up chamber 2 and the taking lens 6, as shown in FIG. 5, there are mounted both a gear train unit 11 for film advancement and shutter charge and a release actuating member 12 which is made movable at a right angle with respect to the axes of the respective gears of said gear train unit 11.

Indicated at numeral 13 is a counter which is arranged at the other side of the winding shaft 3 of the aforementioned film take-up chamber 2 for counting the number of the frames of the film F. Said counter 13 is extended through the bore of the winding shaft 3 and connected to the drive motor 9 through a reduction mechanism (although not shown) so that it is revolved by a predetermined angle corresponding to one scale when the film F is advanced by one frame. Numeral 13' indicates a counter indicating aperture.

Indicated at numeral 14 is a hollow spindle which extends from the side wall of the patrone chamber 7. Said spindle 14 is integrated, as shown in FIG. 5, with a pulley 15 which is coupled through a belt 17 to a pulley 16 fixed to the winding shaft 3 which is revolved by the drive motor 9.

Indicated at numeral 18 is a patrone engaging shaft which is mounted in the side wall of the patrone chamber 7. Said patrone engaging shaft 18 is formed at its inner end with an engagement hook 18a which can engage with an engagement member 8b mounted in the bore of the core 8a of the patrone 8. The patrone engaging shaft 18 thus constructed is keyed (although not shown) to the pulley 15 which is arranged to extend through the side wall of the patrone chamber 7. The shaft 18 is rotationally urged as a result that said pulley 15 is revolved through the belt 17 by the pulley 16 fixed on the winding shaft 3, and is made movable in the horizontal direction (i.e., in the axial direction). Indicated at numeral 43 is a spring for biasing the patrone engaging shaft 18 in a direction to come into engagement with the engagement member 8b of the core 8a of the patrone 8.

Indicated at numeral 20 is a rewind change-over member which engages with a flanged portion 18b formed at the outer end of the patrone engaging shaft 18 and which is integrated with a knob member 19 coming out of a slot 1a formed in the bottom wall of the camera body 1 sideways of the patrone chamber 7. By moving said knob member 19 together with the rewind change-over member 20 in the horizontal directions (i.e., in the directions indicated by arrows), the patrone engaging shaft 18 is moved in the horizontal directions (as indicated by the arrows) to come into and away from engagement with the core 8a of the patrone 8. More specifically, if the rewind change-over member 20 is moved to the left, as seen from FIG. 5, together with the knob member 19, the patrone engaging shaft 18 is moved to the left so that it leaves the patrone 8 against the biasing force of the spring 43. If the knob member 19 is moved to the right, on the contrary, the patrone engaging shaft 18 is moved to the right so that it is urged into engagement with the core 8a of the patrone 8 by the biasing force of the spring 43. That disengaged state is held by the action of a stopper mechanism (not shown).

Indicated at numeral 45 is a mode change-over switch for switching the modes of the drive motor 9 for driving the winding shaft in the winding or rewinding direction. Said change-over switch 45 is constructed of a bifurcated spring contact 45a, which is carried on the rewind change-over member 20, and a printed base (although not shown) corresponding to the former. This printed base is equipped with a grounding terminal G, a winding terminal S1 and a rewinding terminal S2. As a result, if the rewind change-over member 20 is moved to the left to disengage the patrone engaging shaft 18 from the patrone 8, the spring contact 45a is moved to the left so that the grounding terminal G and the winding terminal S1 of the printed base are connected to energize the drive motor 9 in the winding direction. If, on the contrary, the rewind change-over member 20 is moved to the right to bring the engagement hook 18a of the patrone engaging shaft 18 into engagement with the core 8a of the patrone 8, the spring contact 45a is moved to the right so that the grounding terminal G and the rewinding terminal S2 of the printed base are connected to energize the drive motor in the rewinding direction.

Incidentally, reference numerals 22 and 23 indicate a release button and a hanging strap, respectively.

Indicated at numeral 24 is a rear cover which is adapted to cover the film take-up chamber 2, the exposure frame 5 and the patrone chamber 7. Said rear cover 24 can be opened and closed vertically by means of a hinge member 25 which is hinged through a pin 25a to the upper edge of the back of the film take-up chamber 2. The rear cover 24 is naturally required to have complete shield and is equipped with a holding plate 26 for holding the film F in close contact with the exposure frame 5. The rear cover 24 is further equipped on the inner side of its free end with a locking member 28 which can be locked in a hook member 27 mounted on the camera body 1. On the outer side of the rear cover 24, moreover, there is mounted a knob portion 29 for acting said locking member 28 in a released direction.

Numerals 30, 31a and 31b indicate a finder, an autofocusing range-finding aperture and a photometric aperture for automatic exposure, respectively. Since the film take-up chamber 2, exposure frame 5 and patrone chamber 7 are arranged vertically, these range-finding aperture 31a and photometric aperture 31b are formed in positions avoiding the film F being advanced, e.g., in positions (at the righthand side, as viewed from the front) which are offset vertically or horizontally from the taking lens 6.

Indicated at numeral 32 is a slide cover which can be horizontally slide to expose the range-finding aperture 31a, photometric aperture 31b and taking lens 6 to the outside, when opened, and to shield and protect the same when closed. The end edge of a front surface of the slide cover consists of at least one sliding portion 100 in parallel with the sliding direction and at least one contact portion 200 extending in a direction transverse to the sliding direction. The end edges of said slide cover 32 and a stationary cover 33 to abut against each other are formed into a crank shape in their front faces so that the range-finding aperture 31a, the photometric aperture 31b and the taking lens 6 displaced vertically and horizontally, as has been described hereinbefore, may be simultaneously opened or shielded by the small movement of the slide cover 32 and so that the slide cover 32 and the stationary cover 33 may snugly abut against each other when in the closed state. Incidentally, the slide cover 32 and the stationary cover 33 are made to linearly abut against each other at their backs. Moreover, the slide cover 32 also covers the knob member 19 for the rewind switching operation, when it is in its closed state, so that the rewinding operation may be effectively prevented from being carelessly started when the camera is carried.

Indicated at numeral 34 is a locking mechanism which is disposed in a lower portion of the back of the camera body 1 for locking the slide cover 32 in either of its opened and closed states. Indicated at numeral 35 is a unlocking knob member for releasing the locking mechanism 34 from its locking state. The unlocking knob member 35 is mounted in a lower portion of the back of the slide cover 32 in a manner to correspond to the locking mechanism 34.

Indicated at numeral 36 is an embossed portion which is to be touched by the thumb of the photograph taker when he holds the camera body 1 and which is formed on a lefthand lower portion of the back of the camera body 1. Indicated at numeral 37 is a stroboscopic lamp which is disposed at a righthand portion, as viewed from the camera front, i.e., in an upper portion of the front face of the slide cover 32. Indicated at numeral 38 is a capacitor for stroboscopic flash, which is disposed in the vicinity of the stroboscopic lamp 37. Reference numeral 39 indicates an ISO sensitivity setter.

As has been described hereinbefore, according to the present invention, there is provided a 35 mm half-size camera of the type, in which the exposure frame is arranged below the film take-up chamber whereas the patrone chamber is arranged below said exposure frame so that the film may be advanced in the vertical direction, wherein there are arranged at one side of a winding shaft, which is disposed in said film take-up chamber, the drive motor for driving said shaft and a power supply which is located below said drive motor, and wherein a frame number counter is arranged at the other side of said winding shaft. As a result, the motor drive shaft and the film winding shaft are positioned close to each other so that the gear train unit can have its sized reduced and its power transmission made efficient. In addition, the camera body can have its thickness reduced to the minimum (about 30 mm) that can leave a spare for loading the patrone so that it can be made remarkably compact and light.

According to the present invention, moreover, the power supply is arranged below the drive motor. As a result, when two dry cells of UM3, for example, are juxtaposed as that power supply one before the other, the cell accommodating portion is so thickened more than the remaining portions that it can also be used as a camera holding grip. At the same time, the frame number counter is positioned at a central portion of the camera spaced from the grip portion so that it can be clearly observed. Still moreover, the patrone engaging shaft disposed in the aforementioned patrone chamber is so constructed that it can move laterally by the rewind change-over member. As a result, since the film take-up chamber, the exposure frame and the patrone chamber are arranged upright, the half-size camera can not only obtain such a horizontally long frame as can give a stable feeling if it is subjected to photography in the ordinary position but also have its rewinding mechanism simplified in construction to contribute to its size reduction and compactness. Since, moreover, the patrone engaging shaft is moved sideways to come into engagement with the patrone in association with the operation of the rewind change-over member when in the rewinding operation, the rewind change-over member and the patrone engaging shaft have a common moving direction to require any excessive intermediate mechanism inbetween thereby to provide advantages that no spare load is borne upon the wind drive source and that the film winding and rewinding operations can be conducted smoothly and reliably.

If the present structure is applied to the camera with the slide cover, still moreover, the slide cover is enabled to cover even the knob member for actuating the rewind change-over member, when it is in its closed state, whereby the rewinding operation can be effectively prevented from being carelessly started while the camera is being carried.

On the other hand, the rear cover for covering the film take-up chamber, exposure frame and patrone chamber is hinged to the upper portion of the camera. In case the film is to be exchanged with its patrone chamber being positioned at the side of the photograph taker, the rear cover is erected to face him. As a result, if the sun beam or the like is shielded by the erected rear cover, the film exchanging operation can be conducted even under the sun.

On the other hand, if the camera body is constructed to have a laterally long shape by arranging the film take-up chamber, exposure frame and patrone chamber only through partitions and by contouring the camera body with the outer walls of the film take-up chamber and the patrone chamber, and by arranging the finder, the strobo, the strobo-flashing capacitor and the battery chamber in the space located sideways of the film take-up chamber, the exposure frame and the patrone chamber, it is possible to provide a small-sized camera which is so small and light that it can grow accustomed to the hand of the photograph taker when in the photography. At the same time, since the rear cover is opened vertically when the camera is in the horizontally long position, the taker can hold the camera well in his lefthand, when the camera is to be loaded with the film, so that the camera becomes remarkably suitable for the film loading operation in the above-specified position.

What is claimed is:

1. A camera comprising: an exposure frame having a rectangular shape; a film advancing unit including a film take-up chamber and a patrone chamber juxtaposed to each other adjacent to the respective longer sides of said exposure frame; and a taking lens disposed in front of said exposure frame, wherein the improvement resides in that, as viewed from the back of a camera body which is placed such that said exposure frame is long sideways:
   (a) said camera has a nearly rectangular and long sideways shape of body;
   (b) a first camera parts accommodating chamber is disposed at the righthand side of said film advancing unit whereas a second camera parts accommodating chamber is disposed at the lefthand side of the same; and
   (c) a rear cover is arranged such that its lefthand edge is positioned at the boundary between said film advancing unit and said second camera parts accommodating chamber.

2. The camera according to claim 1, wherein said rear cover is sized to cover said exposure frame, said film take-up chamber and said patrone chamber only.

3. A camera according to claim 2, wherein said rear cover is so hinged to an upper portion of said camera body that it can swing up.

4. A camera according to claim 3, wherein said film take-up chamber is positioned in an upper portion of said camera body.

5. The camera of claim 4, wherein said camera body and said slide cover engaging with each other at said sliding position are not disengaged even in said first position.

6. The camera according to claim 1, wherein said rear cover is so hinged to an upper portion of said camera body that it can swing up.

7. The camera according to claim 6, wherein said film take-up chamber is positioned in an upper portion of said camera body.

8. The camera according to claim 1, wherein a motor for driving a winding shaft disposed in said film take-up chamber and a power supply for energizing said motor are arranged in said first camera parts accommodating portion.

9. The camera according to claim 8, wherein said motor for driving said winding shaft is arranged sideways of said winding shaft.

10. A camera comprising: an exposure frame having a rectangular shape; a film advancing unit including a film take-up chamber and a patrone chamber juxtaposed to each other adjacent to the respective longer sides of said exposure frame; and a taking lens disposed in front of said exposure frame, wherein the improvement resides in that, as viewed from the back of a camera body which is placed such that said exposure frame is long sideways:
   (a) said camera has a nearly rectangular and long sideways shape of body;
   (b) a first camera parts accommodating chamber is disposed at the righthand side of said film advancing unit whereas a second camera parts accommodating chamber is disposed at the lefthand side of the same;
   (c) a rear cover is arranged such that its lefthand edge is positioned at the boundary between said film advancing unit and said second camera parts accommodating chamber; and
   (d) a slide cover having a hollow box shape is disposed in a position to cover the outer surface of said second camera parts accommodating portion and is made slidable between a first position, in which it opens said taking lens, and a second position in which it covers said taking lens.

11. The camera of claim 10, wherein an end edge of a front opening surface of said slide cover consists of at least one sliding portion in parallel with the sliding direction and at least one contacting portion extending cross direction with the sliding direction.

12. The camera of claim 11, wherein said of contacting portion of the slide cover is in contact situation with a corresponding contacting portion of the camera body when said slide cover is in its second position.

13. The camera of claim 11, wherein said sliding portion is formed at least at the front side of said camera body.

14. The camera of claim 13 wherein the sliding portion engages the corresponding sliding portion of the camera body.

15. The camera of claim 14 wherein at least two regions which are separated by the sliding portion and the corresponding sliding portion of the camera body are formed when said slide cover is in the first position, said taking lens is positioned in one of said regions, and at least one of a photomertic aperture and a range finding aperture are positioned in the other region.

16. The camera of claim 10, wherein at least a finder and stroboscopic means are arranged inside said slide cover.

* * * * *